(12) United States Patent
Tiller et al.

(10) Patent No.: US 7,395,790 B2
(45) Date of Patent: Jul. 8, 2008

(54) REED VALVE BREATHER FOR EVOLUTION ENGINE

(75) Inventors: Timothy T. Tiller, Blue River, WI (US); James Simonelli, Richland Center, WI (US); Floyd Baker, Readstown, WI (US); David Roethel, LaFarge, WI (US); Jeffrey Bailey, Westby, WI (US); Bill Swiggum, Viroqua, WI (US)

(73) Assignee: S&S Cycle, Inc., Viola, WI (US)

( * ) Notice: Subject to any disclaimer, the term of this patent is extended or adjusted under 35 U.S.C. 154(b) by 0 days.

(21) Appl. No.: 11/008,208

(22) Filed: Dec. 10, 2004

(65) Prior Publication Data

US 2006/0102113 A1    May 18, 2006

Related U.S. Application Data

(60) Provisional application No. 60/628,541, filed on Nov. 18, 2004.

(51) Int. Cl.
*F02B 25/00* (2006.01)
*F02B 33/00* (2006.01)
*F16K 15/00* (2006.01)
*F16K 21/10* (2006.01)

(52) U.S. Cl. .................. 123/65 V; 123/73 V; 137/514; 137/512

(58) Field of Classification Search .............. 123/65 V, 123/73 V, 73 A; 137/855, 856
See application file for complete search history.

(56) References Cited

U.S. PATENT DOCUMENTS

| | | | |
|---|---|---|---|
| 2,111,242 A | 3/1938 | Harley | |
| 3,042,013 A * | 7/1962 | Nelson | ................ 123/73 V |
| 4,082,295 A | 4/1978 | Bainard | |
| 4,142,487 A | 3/1979 | Somraty | |
| 4,532,897 A | 8/1985 | Mezger | |
| 4,643,139 A | 2/1987 | Hargreaves | |
| 4,696,263 A | 9/1987 | Boyesen | |
| 4,765,291 A | 8/1988 | Kurio et al. | |
| 4,869,213 A | 9/1989 | Panzica | |
| 4,901,307 A | 2/1990 | Gilhousen et al. | |
| 5,103,459 A | 4/1992 | Gilhousen et al. | |

(Continued)

FOREIGN PATENT DOCUMENTS

JP    2-207127    8/1990

(Continued)

OTHER PUBLICATIONS

RevTech.RTM.Adjustable Breather Valves, Crankcase Breathers, Engine, p. 10, undated catalog.

(Continued)

*Primary Examiner*—Stephen K. Cronin
*Assistant Examiner*—Hyder Ali
(74) *Attorney, Agent, or Firm*—Steptoe & Johnson LLP (57) ABSTRACT

A reed valve assembly is provided with a body, at least one flexible member, and at least one rigid member. Preferably, the at least one flexible member has a periphery so as to substantially cover opening(s) in the body when positioned adjacent to the body, and the at least one rigid member has a periphery so as to limit deformation of the at least one flexible member.

25 Claims, 8 Drawing Sheets

U.S. PATENT DOCUMENTS

| | | |
|---|---|---|
| 5,243,934 A | 9/1993 | Boyesen |
| 5,343,521 A | 8/1994 | Jullien et al. |
| 5,416,829 A | 5/1995 | Umemoto |
| 5,526,426 A | 6/1996 | McLauglin |
| 5,764,753 A | 6/1998 | McCaslin et al. |
| 5,838,787 A | 11/1998 | Ding et al. |
| 6,148,078 A | 11/2000 | Romesburg |
| 6,185,300 B1 | 2/2001 | Romesburg |
| 6,189,496 B1 | 2/2001 | Heffner et al. |
| 6,249,581 B1 | 6/2001 | Kok |
| 6,457,449 B1 | 10/2002 | Troxler et al. |
| 6,622,030 B1 | 9/2003 | Romesburg et al. |
| 6,889,066 B2 | 5/2005 | Gupta et al. |
| 7,063,078 B2 | 6/2006 | Dees et al. |

FOREIGN PATENT DOCUMENTS

| | | |
|---|---|---|
| JP | 3-100317 | 4/1991 |
| JP | 4-72423 | 3/1992 |
| JP | 4-121420 | 4/1992 |
| JP | 5-163951 | 6/1993 |
| JP | 5-179971 | 7/1993 |
| JP | 5-195794 | 8/1993 |
| JP | 5-195795 | 8/1993 |
| JP | 6-117262 | 4/1994 |
| JP | 6-200768 | 7/1994 |
| JP | 6-307561 | 11/1994 |
| JP | 8-74580 | 3/1996 |
| JP | 8-105328 | 4/1996 |
| JP | 8-151928 | 6/1996 |
| JP | 8-210142 | 8/1996 |
| JP | 9-242551 | 9/1997 |
| JP | 10-220234 | 8/1998 |
| JP | 2003-343232 | 12/2003 |

OTHER PUBLICATIONS

Declaration of Scott A. Sjovall, including Exhibits A-F.
S&S Cycle Catalog (Feb. 2002), coverpage and pp. 12-15, printed in USA.

* cited by examiner

REED VALVE BREATHER FOR EVOLUTION ENGINE

CORRESPONDING RELATED APPLICATION

The present invention claims the benefit of and priority to provisional patent application Ser. No. 60/628,541, entitled MOTORCYCLE ENGINE, filed on Nov. 18, 2004, the entire contents of which are incorporated by reference herein in its entirety.

BACKGROUND OF THE INVENTION

1. Field of the Invention

The present invention relates generally to reed valve assemblies, and more particularly to motorcycle reed valve assemblies.

2. Description of the Related Art

Breather valves for motorcycle engines have been used for many years. The purpose of a breather valve is generally twofold. First, it expels air and oil from the crank region, on the down stroke of the pistons, to the gear case where the oil lubricates various gears and other parts. Second, it draws oil from the bottom of the oil separating pocket (also sometimes referred to as the "settling pocket") in the bottom of the gear case. Exemplary breather valves are described in U.S. Pat. No. 6,189,496; U.S. Pat. No. 6,457,449 and U.S. Published Patent Application No. 20040123823, which are all incorporated by reference herein in their entirety.

An exemplary known breather valve 10 is shown in FIGS. 1-4. The illustrated breather valve 10 is commonly known as a "flapper" breather valve, because it includes a flexible member 21 which is commonly referred to as a flapper by those of skill in the relevant art. As illustrated, breather valve 10 includes a body 19 with a plurality of bores 22 formed therein. The bores 22 in body 19 are sealed via flexible member 21, which is coupled to a top surface of the body 19 via fastener 23. In operation, the flexible member 21 flexes to selectively cut off or open air and/or oil flow to/from bores 22.

Many known valve assemblies, such as rotary breather gears (not shown), are typically designed for engines operating at specific revolution per minute (RPM) ranges. Such a configuration, however, is disadvantageous for engines typically operating at lower RPM ranges, at higher RPM ranges, or wide RPM ranges—i.e., ranges different from the optimized ranges of known valve assemblies. Further, many known valve assemblies suffer from relatively high engine noise during operation. This can be a significant problem with gear driven rotary breather valves primarily due to gear meshing from the gear driven arrangement.

Additionally, known rotary breather valve assemblies often require shims for proper mounting within an engine. Shims add cost and complexity to the installation process, and thus are undesirable.

Further, known valve assemblies do not sufficiently protect against engine damage during engine failure, which adds to the cost and complexity of repairing damaged engines. In known valve assemblies, when an engine has a failure, debris can pass through the breather passage and become trapped between the breather gear and the bore. Trapped debris can tear up the bore, which then requires machining and an oversized replacement part to repair the damage from the trapped debris. Thus, a need exists for an improved breather valve assembly.

Other problems with the prior art not described above can also be overcome using the teachings of the present invention, as would be readily apparent to one of ordinary skill in the art after reading this disclosure.

DETAILED DESCRIPTION OF THE EXEMPLARY EMBODIMENTS

Reference will now be made in detail to exemplary embodiments of the present invention. Wherever possible, the same reference numbers will be used throughout the drawings to refer to the same or like parts.

A reed valve assembly 600 according to a first embodiment of the present invention is shown in FIGS. 5-9. The reed valve assembly 600 may be used to replace a conventional breather valve in an existing motorcycle crank case 100 (see FIG. 10). i.e., the reed valve assembly 600 may have a periphery so as to be interchangeable with a conventional breather valve. Alternatively, reed valve assembly 600 may be provided with or sold for use in a new motorcycle crank case 100. Other configurations and uses are also contemplated, including non-motorcycle applications such as all terrain vehicles (ATVs), automobiles, farm equipment, generators, law mowers, etc.

Figure 1:
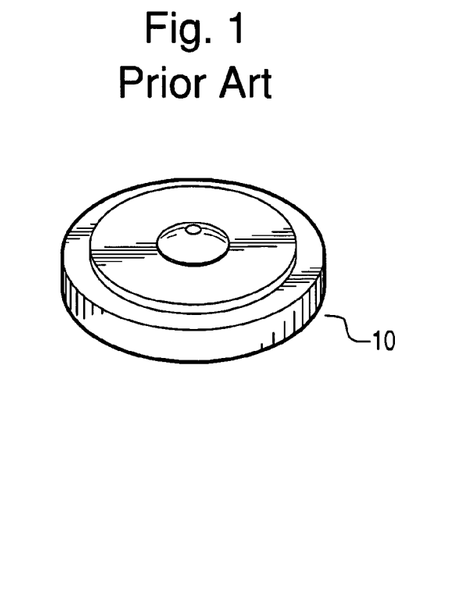
FIGS. 1-4 depict a known breather valve.
Figure 2:
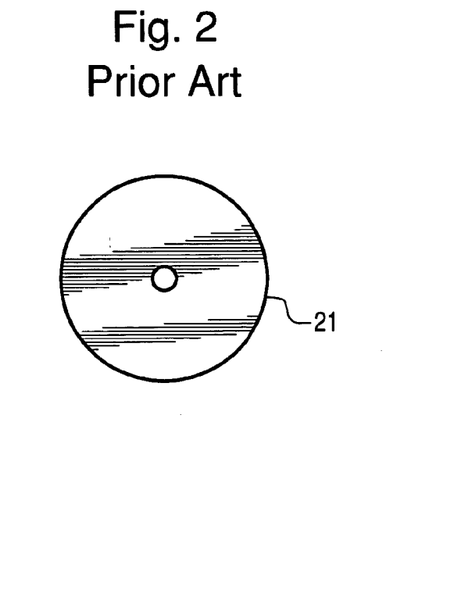
Figure 3:
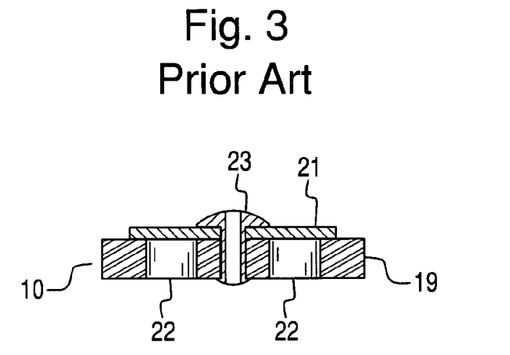
Figure 4:
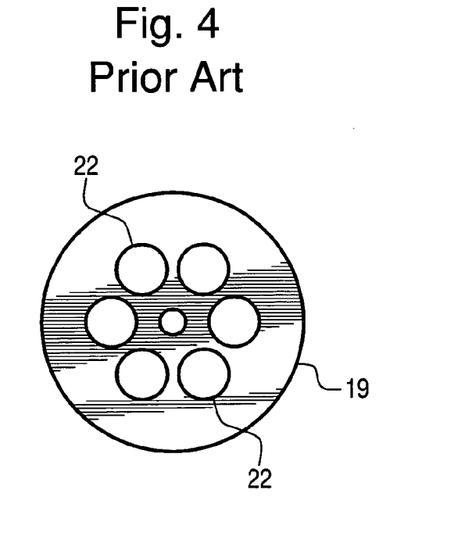
Figure 5:
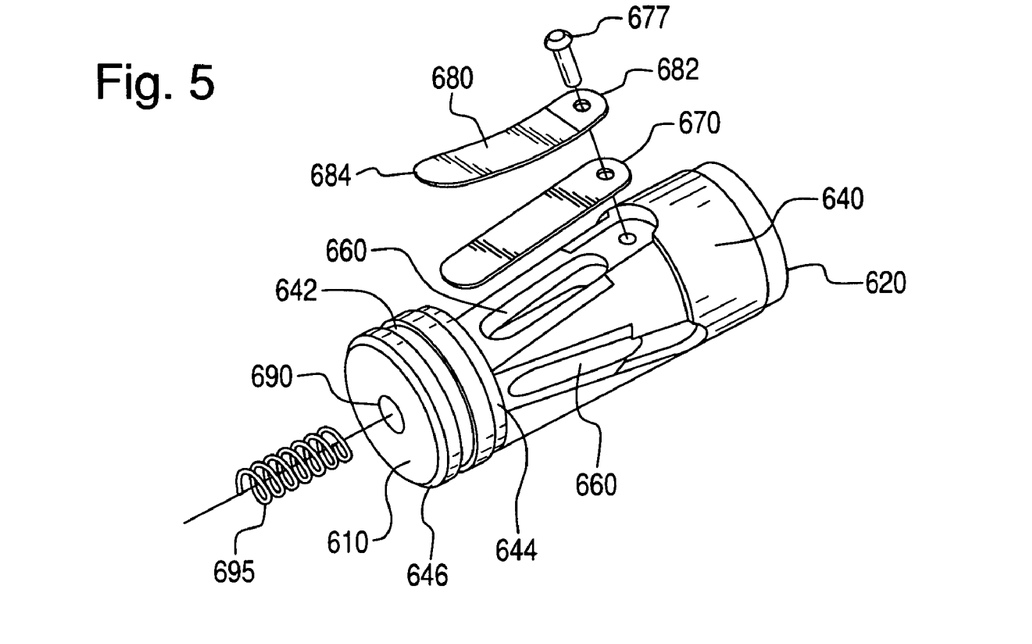
FIG. 5 is an exploded assembly view of a rotatably mounted reed valve assembly according to an embodiment of the present invention.
Figure 6:
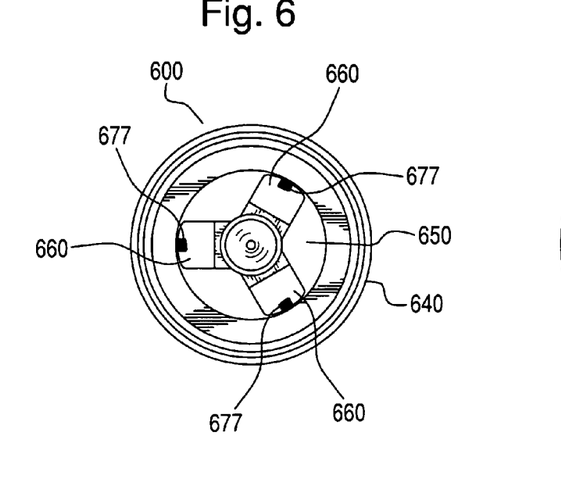
FIG. 6 is a bottom view of the reed valve assembly of FIG. 5.
Figure 7:
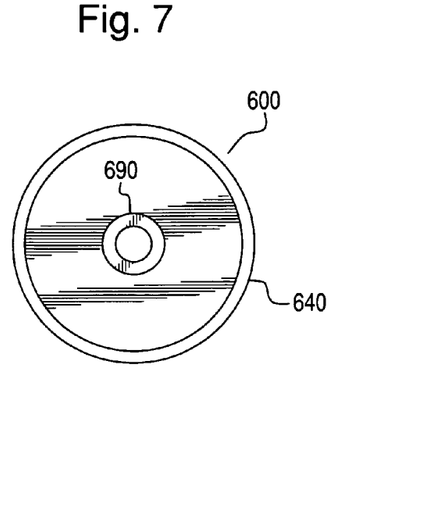
FIG. 7 is a top view of the reed valve assembly of FIG. 5.

As illustrated, the reed valve assembly 600 includes an elongated body 640 with a first end 610 and a second end 620. The body 640 (and/or other components of the assembly) can be formed of any solid metal, alloy or composite material. Preferably, a material should be selected that can withstand common engine temperatures (e.g., about 300° F.) and an oil-rich environment. The material selected may be heat treated and/or surface finished to enhance fatigue resistance depending on the particular application at hand. Exemplary materials suitable for various embodiments of the present invention include stainless steel, carbon steel, aluminum, brass, titanium, fiberglass, carbon fiber, and plastic. Other materials are also contemplated.

An internal cavity 650 is formed within the body 640, internal cavity 650 extending from the second end 620 toward the first end 610. The cavity 650 may include a hole substantially in the center of the cavity 650 as shown best in FIG. 6. This hole provides spacing for cutting a taper in the body 640, makes manufacturing easier, and reduces the weight of the reed valve assembly 600. The internal cavity 650 is adapted and configured to act as a conduit through which fluid (e.g., oil) and/or gas (e.g., air) passes between a crank region and a gear case, preferably via at least one opening 660 extending from an outer surface of the body 640 to the internal cavity 650.

In the embodiment shown, three openings 660 are provided and spaced substantially uniformly from one another about the outer surface of the body 640. Preferably, the three openings 660 are symmetric to facilitate easier installation, as a tip of the at least one rigid member 680 has to clear the crank case hole in which the reed valve assembly 600 is installed. By orienting the openings 660 substantially symmetrical to one another, clearance for each rigid member 680 is maximized. Other configurations are also contemplated, such as one, two, three, or more openings which may or may not be substantially uniformly spaced from one another about the outer surface of the body 640.

Preferably, the at least one opening 660 has an elongated shape to enhance the window size through which air/fluid can pass to/from internal cavity 650. The elongated shape may include shapes such as a substantially rectangular periphery with arc-shaped ends. This type of geometry can also be referred to as "paperclip" or "race track" shaped. Other shapes are also contemplated, such as rectangular or ovular shapes.

Figure 9:
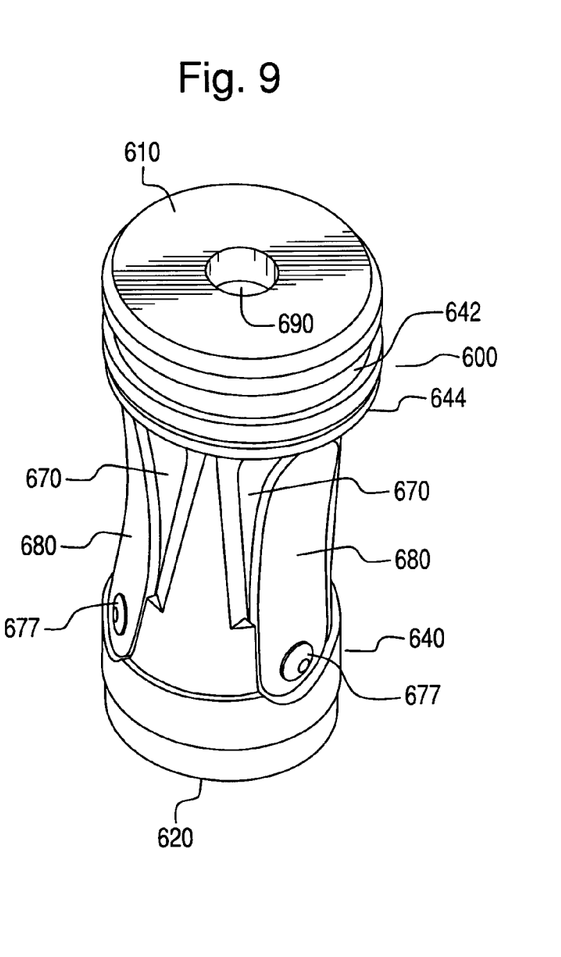
FIG. 9 is a perspective view of the reed valve assembly of FIG. 5.

To selectively allow the fluid/gas communication, at least one flexible member 670 is provided, the at least one flexible member 670 preferably having a periphery closely conforming to that of the at least one opening 660 so as to substantially cover the at least one opening 660 when positioned adjacent to the body 640 in a closed position (see FIG. 9). Any one of the aforementioned materials may be used for the at least one flexible member 670 provided the material selected has a sufficient elasticity so as to allow for repeated flexing without breakage. According to one embodiment of the present invention, the at least one flexible member is made of "reed valve" or "flapper" steel. Those of skill in the art will appreciate that "flapper valve" or "reed valve" steel is one exemplary application specific steel, two examples of flapper valve or reed valve steel brand names are Sandvik 20c and UHB 20c each with a tensile strengths of about 300 ksi.

The noted periphery of the at least one flexible member 670 may be adapted and configured to improve reaction time, and also to improve the lifetime of the at least one flexible member 670. Specifically, the shorter and/or narrower the at least one flexible member 670 (and corresponding opening 660), the more the at least one flexible member 670 has to bend to allow the same amount of gas/fluid communication. Hence, providing a relatively long and wide at least one flexible member 670 results in greater opening with less bending—i.e., improved reaction time. Moreover, reducing the amount of bend also leads to greater part life, as breakage in the at least one flexible member 670 is directly related to the amount and frequency of bending. Thus, the at least one flexible member preferably has the noted periphery.

As shown, preferably at least one flexible member 670 is provided for each opening 660 in the body 640. It should be appreciated that the more flexible members 670 and openings 660 that are provided, the less the flexible members 670 have to deflect to provide sufficient gas/fluid communication. Thus, increasing the number of at least one flexible members 670 and openings 660 will generally improve the reaction time of the reed valve assembly 600. However, a large number of flexible members 670 and openings 660 adds to the cost and complexity of the reed valve assembly 600. Thus, one must balance the improved performance versus the cost in selecting the appropriate number of flexible members 670 and openings 660 for any given application.

The reed valve assembly 600 may also include at least one rigid member 680 to limit deformation of the at least one flexible member 670. The at least one rigid member 680 can be made from any one of the aforementioned materials or the like. Preferably, the at least one rigid member 680 is mountable proximate to the at least one flexible member 670 and has a periphery substantially conforming to that of at least one flexible member 670 so as to limit and control deformation of the at least one flexible member 670.

According to one embodiment of the present invention, the at least one rigid member 680 includes a substantially arc-shaped bend between a first end 682 and a second end 684 thereof, with the first end 682 being rigidly attached to the body 640. The at least one rigid member 680 may have a gradual arc-shaped bend between a first end and a second end, so as to be free of any abrupt/sharp bends. Elimination of abrupt/sharp bends reduces the presence of stress risers in the at least one flexible member 670 when bending from a closed position to an open position (bending thereof being controlled by at least one rigid member 680). This improves the life of the at least one flexible member 670.

The at least one rigid member 680 may be mounted such that the second end is spaced from the body 640 in the range of about 0.062" to about 0.280". More preferably, the at least one rigid member 680 is mounted such that the second end is spaced from the body 640 in the range of about 0.140" to about 0.280". Most preferably, the at least one rigid member 680 is mounted such that the second end is spaced from the body 640 at about 0.280". Other spacings are also contemplated, though typically the spacing selected relates to the hole diameter in which the reed valve assembly 600 is installed.

As shown best in FIG. 5, the at least one rigid member 680 and the at least one flexible member 670 are mounted over the at least one opening 660 on the body 640 in a completed assembly. The reed valve assembly 600 may include at least one fastener 677, such as a screw, bolt, rivet, weld, etc., for fastening the at least one rigid member 680 and the at least one flexible member 670 to the body 640. Other configurations are also contemplated.

Preferably, the at least one fastener 677 has a minimal size so as to fit within the engine crank case hole in which the reed valve assembly 600 is installed. Additionally, the at least one fastener 677 may be oriented on the body 640 so as to position the at least one flexible member 670 for maximum gas/fluid flow. As such the at least one fastener 677 is preferably positioned (and may be completely shrouded) within a recessed portion of the body 640, closer to the second end 620 than the first end 610 of the body 640. This allows for an increased body diameter within the cavity 650, and orients the at least one flexible member 670 to have a flexing end along the flow path coming in from second end 620.

Figure 10:
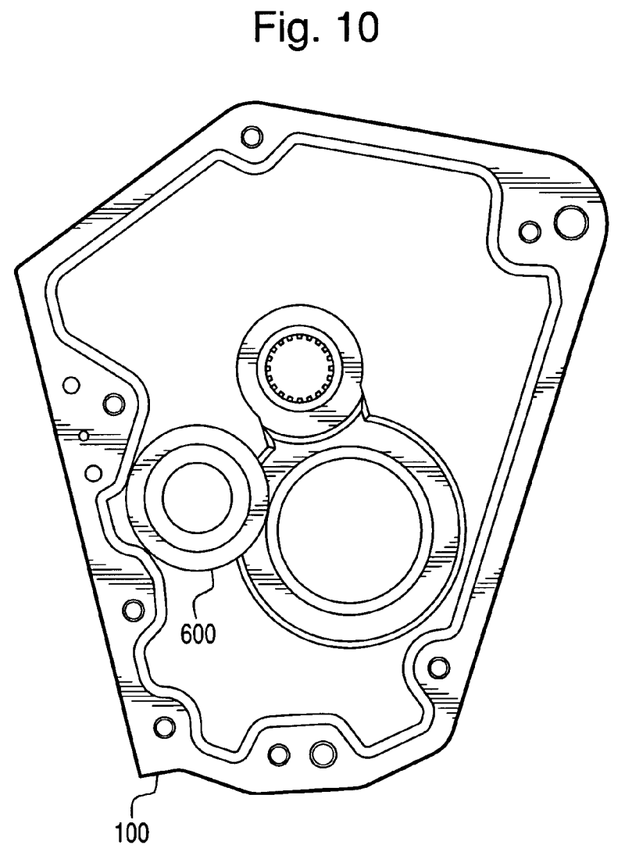
FIG. 10 depicts a crank case with the reed valve assembly of FIG. 5 installed therein.
Figure 11:
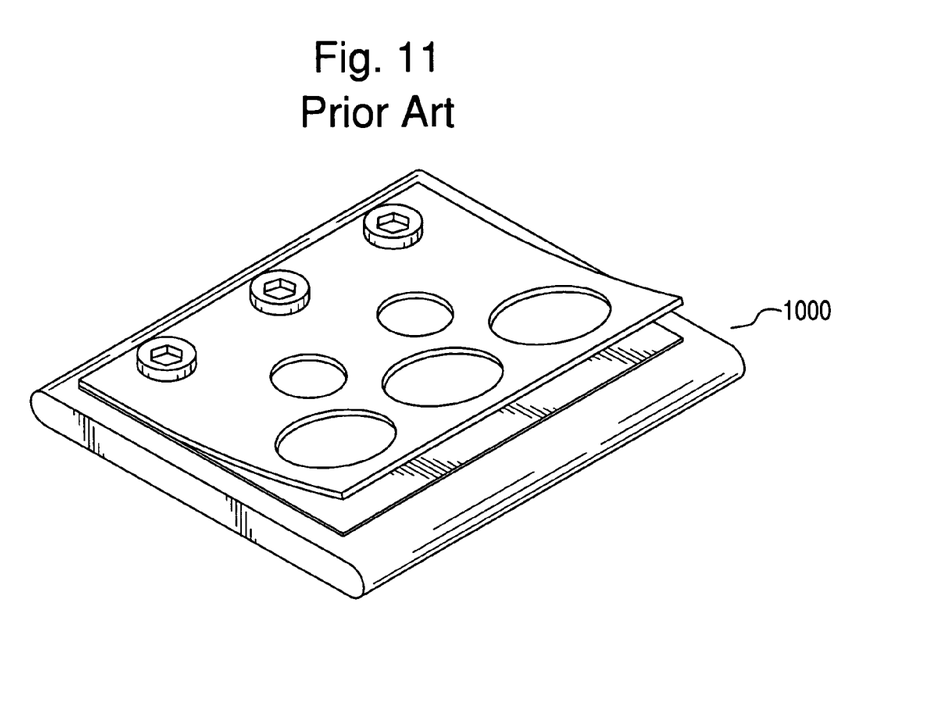
FIGS. 11-14 depict a known fixed mounted reed valve.
Figure 12:
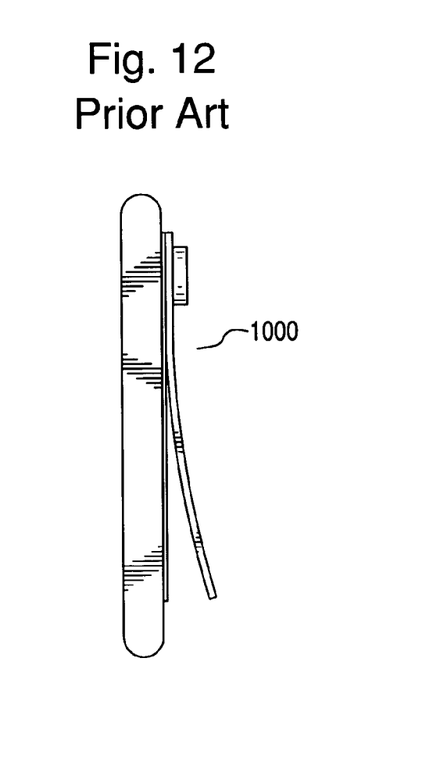
Figure 13:
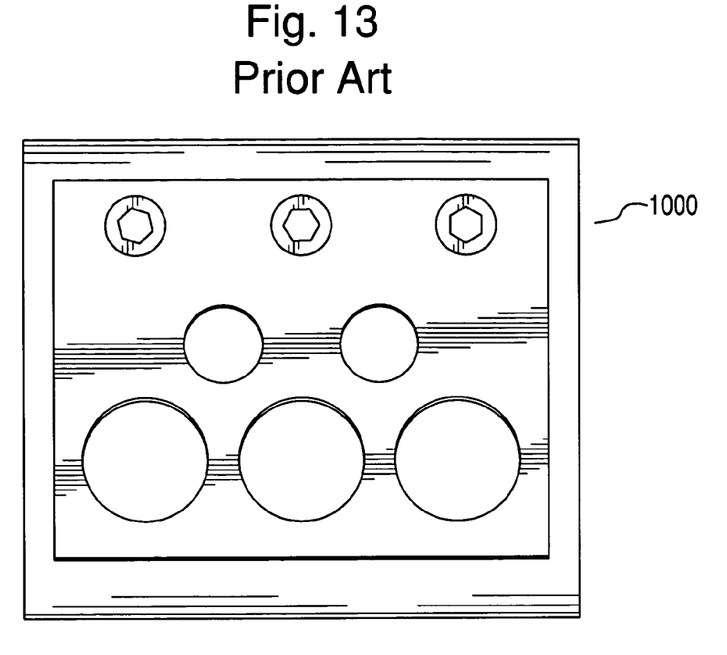
Figure 14:
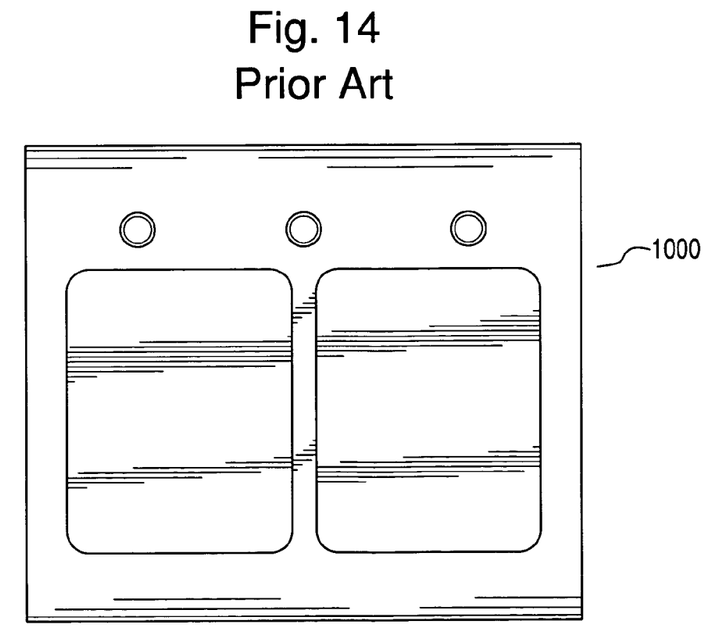

To facilitate mounting within the engine crank case 100 as shown in FIG. 10, the first end 610 of the body 640 may include an opening 690 for receiving a spring 695. Spring 695 may be provided to eliminate the need for spacers used to space the end play involving conventional gear driven breather valves. If provided, spring 695 provides a force between a gear cover and the reed valve assembly 600, thereby holding the reed valve assembly 600 seated against the crank case. This force reduces movement of the reed valve assembly 600 in response to the pressure waves acting thereon, which reduces wear on the reed valve assembly 600 and also reduces movement based noise.

The reed valve assembly 600 may also include at least one groove 642, 644 and/or at least one beveled edge 646, 648 formed proximate to the first end 610 of the body 640. Groove 644 is a machining relief to reduce (preferably eliminate) a radius between the circular wall that is formed between beveled edge 648, groove 644 and the flat surface facing end 620. If groove 644 were eliminated, tools used to machine the body 640 would leave a radius in the corner that would bump up against the crank case during installation. As such, groove 644 is provided to improve machining of the body 640 and installation within an engine crank case.

Groove 642 may be provided to make it easier to remove the reed valve assembly 600 from an engine crank case. More specifically, end 620 protrudes from the engine crank case when the reed valve 600 is installed in a crank case, thereby acting as knob for a mechanic to grab. Groove 642 improves grip on the reed valve assembly 600, and also may be used as a prying surface (e.g., with a screw driver) if the reed valve assembly 600 becomes stuck in the crank case after a long period of use. As would be understood by those of skill in the art, knurling may or may not be provided to improve gripping ability. Chamfer 646 and/or 648 may also be provided to eliminate a sharp edge on the body 640 and to improve the installation/removal process.

Figure 8:
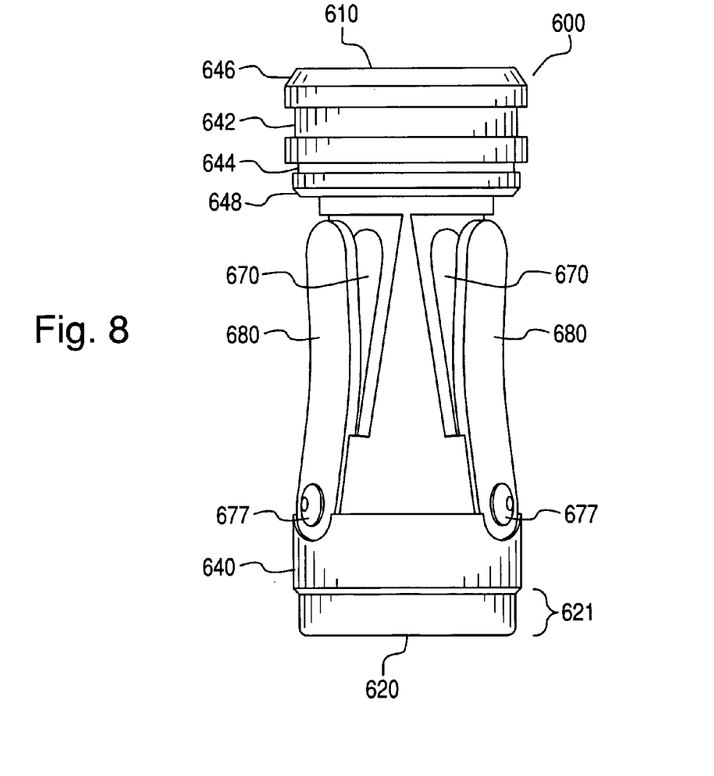
FIG. 8 is a side view of the reed valve assembly of FIG. 5.

As shown best in FIG. 8, the reed valve assembly 600 may also include a metered oil flow region 621 formed on an outer surface of body 640. The metered oil flow region 621 may extend from the second end 620 of the body 640 toward the first end 610 of the body. Preferably the metered oil flow region 621 has a smaller diameter than an adjacent region on the body 640 as shown.

The metered oil flow region 621 provides a metered pathway for oil to flow from a settling pocket in the engine crank case into the gear case. Specifically, in many applications the engine crank case includes an oil hole that extends from a settling pocket to a region adjacent the reed valve assembly 600. During operation, a vacuum in the flywheel cavity is formed (based on piston movement) which draws oil up through the hole. Left unmetered, this oil flow can degrade engine performance. As such, metered oil flow region 621 is provided to control the oil flow rate passing adjacent to the reed valve assembly 600.

According to another embodiment of the present invention, a region adjacent metered oil flow region 621 on body 640 may provide a sealing surface for the reed valve assembly 600. As such, a diameter of this region may have a fairly close tolerance to keep a minimal distance between it and an inner diameter (ID) of the hole in the engine crank case in which the reed valve assembly 600 is installed, thereby substantially sealing gas/fluid flow adjacent this surface. Alternatively, an o-ring groove and o-ring may be provided to seal the reed valve assembly 600 if needed. Other configurations are also contemplated.

As disclosed in the aforementioned embodiments, the presently disclosed reed valve assembly can operate over a wider range of RPMs (e.g., about 500 RPM to about 8,000 RPM) than conventional breather valves, does not require timing to crank position/orientation as do many conventional breather valves, and generally has improved performance over conventional breather valve assemblies.

By way of example, conventional breather valve assemblies, such as gear driven breather valves, are tuned to operate at one engine speed and at all other speeds engine efficiency is compromised. Incorrect timing can cause conventional breather assemblies to become flooded with oil due to severe pressure fluctuations. In contrast, the pressure wave actuated reed valve assembly disclosed in various embodiments of the present invention operates whenever crank case pressure exceeds cam chest pressure, regardless of crank position.

Additionally, none of the aforementioned embodiments require shims or spacers for proper installation and mounting. In known assemblies requiring shims or spacers, these shims/spacers must be sized and fitted to the particular gear valve adding to the complexity of the installation process. Thus various embodiments of the present invention eliminate the actual fitting processes in addition to elimination of the shims/spacers themselves.

According to another embodiment of the present invention, due to the structure of one or more of the disclosed embodiments, the reed valve assembly should be installed in a precisely bored hole, but the orientation of the reed valve is not critical. In known applications, the window that intersects the valve bore in the crank case should also be precisely cut so the leading and trailing edges are timed correctly with rectangular holes in the breather valve. In one or more of the present embodiments, however, no such timing is required. Hence, in some applications, a side cutter could be used to machine the window for the reed valve assembly or the crank case may be cast to include the window for the reed valve assembly, reducing the cost and complexity of the engine crank case.

Other advantages and features will also be readily apparent to those of skill in the art upon practicing embodiments of the present invention. By way of example, various embodiments of the present invention may be utilized to improve operation of existing motorcycle engines, such as the S&S Cycle 4⅛" bore engine series. The reed valve assembly 600 may be provided as a retrofit kit for engines (e.g., the 4⅛" bore engine series) previously manufactured and sold with alternative breather valve arrangements, or with new engines presently being manufactured and sold. A retrofit application is described in greater detail below to illustrate one exemplary use of the disclosed reed valve assembly 600.

With the 4⅛" bore engine series and other similarly configured engines, a positive crank case ventilation system is provided by attaching a line from the intake manifold after the throttle butterfly to the crank case vent. Routing the crank case vent into the intake manifold applies a vacuum in the crank case, resulting in a better ring seal. This arrangement also eliminates external oil seepage onto the engine as the vacuum does not allow oil to leak while running. Further, with this arrangement blowby vapors (i.e., vapors containing an oily mist) are not directly vented outside of the engine. Rather, the oily vapors are consumed through the internal combustion process. This eliminates accumulation of the blowby vapors on external surfaces of the engine and/or motorcycle.

While engines such as the 4⅛" bore engine series have many advantages over other engines, occasionally these engines have been found to generated a heavy blue smoke while running. Heavy smoking may be caused, for example, by oil ingestion through the intake manifold due to carry-over. Carry-over happens when the breathing system becomes overcome with oil, and allows oil to exit the engine through the breathing system.

The reed valve assembly 600 may address this carry-over problem by increasing the amount of air required to generate carry-over and allowing a higher vacuum in the crank case. As an example, a measured amount of compressed air may be introduced into an engine crank case while running at various engine speeds and loads to identify the amount of air required to cause carry-over. With the reed valve assembly 600, twice as much air is required (in comparison to at least one known breather valve) before carry-over happens. Thus, the reed valve assembly 600 improves engine operation over known breather valve assemblies in existing motorcycle engines.

Figure 15:
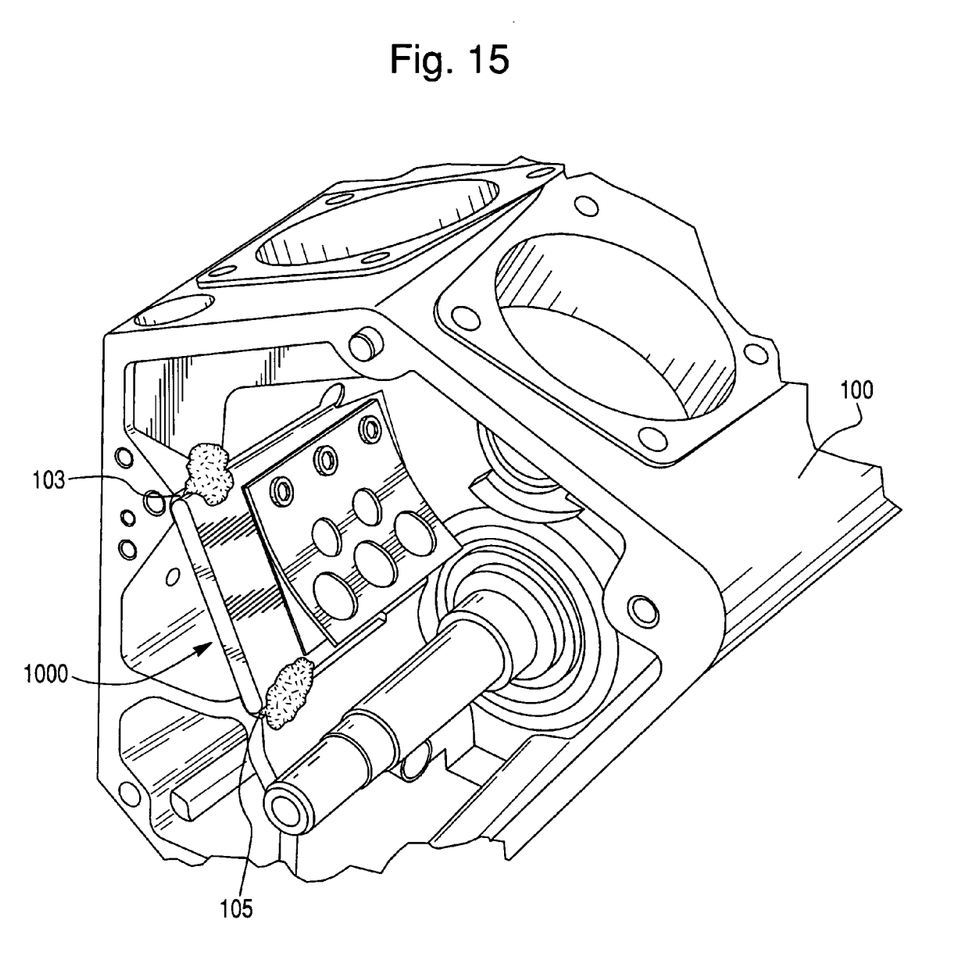
FIG. 15 depicts a crank case with the reed valve assembly of FIG. 11 installed therein according to an embodiment of the present invention.

Another conventional reed valve assembly 1000 is shown in FIGS. 11-14. According to one embodiment of the present invention, the reed valve assembly 1000 may be installed in a motorcycle crank case 100 as shown in FIG. 15. Other configurations and uses are also contemplated.

As illustrated, the reed valve assembly 1000 includes a substantially plate shaped body. To facilitate rigid/fixed mounting within the engine crank case 100 (see FIG. 15), a cross section of the body may be substantially rectangular with arc-shaped ends (see FIG. 12). These arc-shaped ends are adapted and configured to fit within two chamfered surfaces 103, 105 in crank case 100 (see FIG. 15). Preferably, once the arc-shaped ends are placed within the chamfered surfaces 103, 105, the reed valve assembly 1000 is then welded to the crank case or otherwise rigidly attached thereto. Other configurations are also contemplated.

Figure 16:
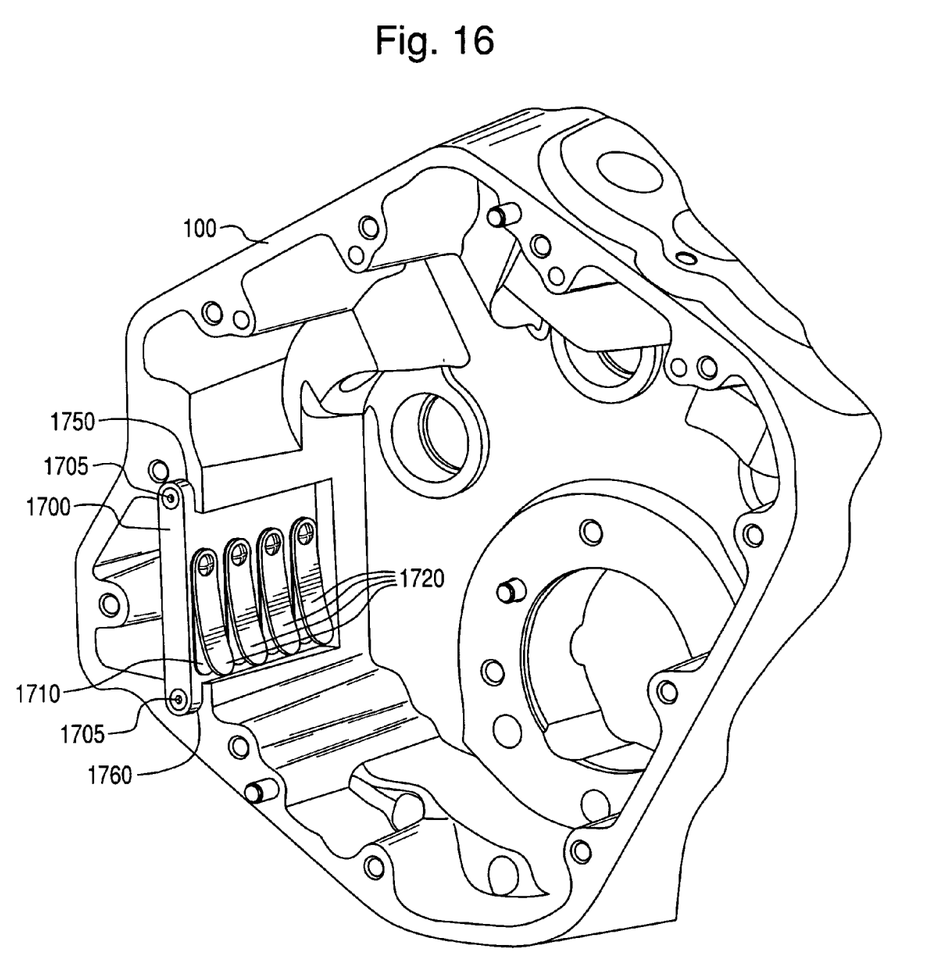
FIG. 16 depicts a crank case with a reed valve assembly according to another embodiment of the present invention installed therein.

A reed valve assembly 1700 according to another embodiment of the present invention is shown installed in a crank case 100 in FIG. 16. The reed valve assembly 1700 includes a plurality of flexible members 1710 covering a corresponding number of openings. A plurality of rigid members 1720 may also be provided to limit bending of the flexible members 1710. Operation of the reed valve assembly 1700 is similar to the operation of reed valve assembly 600 shown in FIG. 5.

Preferably, the reed valve assembly 1700 and/or crank case 100 is adapted and configured to fixedly mount the reed valve assembly 1700 within crank case 100 as shown. In particular, the crank case 100 may include an upper and lower receiving slot 1750, 1760 respectively for receiving the reed valve assembly 1700. A gear cover (not shown) may be positioned adjacent the crank case 100, thereby retaining the reed valve assembly 1700 within the crank case 100 without requiring any fasteners acting on the reed valve assembly 1700 itself.

According to one embodiment of the present invention, at least one stop 1705 is provided on an outer surface of the reed valve assembly 1700. At least one stop 1705 may be formed of an elastic material, such as rubber, to provide a force between the gear cover and the reed valve assembly 1700. Alternatively, a spring or other dampening member may be provided as would be readily apparent to those of skill in the art after reading this disclosure.

The foregoing description of various embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

| Parts List | |
|---|---|
| First Embodiment | |
| beveled edges | 646, 648 |
| elongated body | 640 |
| engine crank case | 100 |
| fastener | 677 |
| first end of body | 610 |
| first end of rigid member | 682 |
| flexible member | 670 |
| grooves | 642, 644 |
| internal cavity | 650 |
| metered oil flow region | 621 |
| openings | 660 |
| reed valve assembly | 600 |
| rigid member | 680 |
| second end of body | 620 |
| second end of rigid member | 684 |
| spring opening | 690 |
| spring | 695 |
| Second Embodiment | |
| chamfered surfaces | 103, 105 |
| engine crank case | 100 |
| reed valve assembly | 1000 |
| Third Embodiment | |
| chamfered surfaces | 1750, 1760 |
| engine crank case | 100 |
| flexible members | 1710 |
| reed valve assembly | 1700 |
| rigid members | 1720 |
| stop | 1705 |

What is claimed is:

1. A reed valve assembly, comprising:
    an elongated body including
        a first end;
        a second end opposite the first end;
        an internal cavity extending from the second end toward the first end;
        at least one opening between the first end and the second end, the at least one opening extending from an outer surface of the body to the internal cavity; and
        a metered oil flow region extending from the second end toward the first end; and
    at least one flexible member having a periphery so as to substantially cover the at least one opening when positioned adjacent to the body, the at least one flexible member being pressure wave actuated from a closed position to an open position.

2. The reed valve assembly of claim 1, wherein the reed valve assembly operates independent from a crank orientation within an engine.

3. The reed valve assembly of claim 1, wherein the reed valve assembly includes at least three openings between the first end and the second end.

4. The reed valve assembly of claim 1, wherein the body includes a plurality of openings spaced substantially uniformly from one another about the outer surface of the body.

5. The reed valve assembly of claim 1, wherein the at least one opening has a substantially rectangular periphery with arc-shaped ends.

6. The reed valve assembly of claim 1, further comprising at least one rigid member mountable proximate to the at least one flexible member and having a periphery so as to limit deformation of the at least one flexible member.

7. The reed valve assembly of claim 6, further comprising at least one fastener for fastening the at least one rigid member and the at least one flexible member to the body.

8. The reed valve assembly of claim 6, wherein a first end of the at least one rigid member is mounted on the body such that a second end of the at least one rigid member is spaced from the body in the range of about 0.062" to about 0.280".

9. The reed valve assembly of claim 6, wherein the at least one rigid member has a gradual arc-shaped bend between a first end of the at least one rigid member and a second end of the at least one rigid member.

10. The reed valve assembly of claim 1, wherein the body is substantially cylindrical.

11. The reed valve assembly of claim 10, wherein the body has a periphery so as to be interchangeable with a gear driven breather valve.

12. An engine including the reed valve assembly of claim 1.

13. The reed valve assembly of claim 1, wherein the reed valve assembly is formed of one of steel, aluminum, brass, titanium, fiberglass, carbon fiber, and plastic.

14. The reed valve assembly of claim 1, wherein the metered oil flow region has a smaller diameter than an adjacent region on the body.

15. An engine crank case, comprising:
a crank region;
a gear region;
at least two chamfered surfaces for receiving a reed valve assembly, the reed valve assembly controlling gas/fluid communication between the crank region and the gear region; and
a reed valve slot extending from a first chamfered surface to a second chamfered surface, the reed valve slot having a periphery to receive the reed valve assembly,
wherein the reed valve assembly includes at least one flexible stop adapted and configured to apply a force between the reed valve assembly and a gear cover.

16. A method of installing a reed valve in a motorcycle engine, comprising:
providing a crank case including a hole for receiving a gear driven breather valve;
positioning a pressure actuated reed valve within the hole; and
mounting a cover on the crank case so as to retain the pressure actuated reed valve within the hole.

17. The method of claim 16, further comprising:
removing the gear drive breather valve from the hole prior to positioning the pressure actuated reed valve within the hole.

18. The method of claim 16, further comprising one of:
cutting the hole within the crank case using a side cutter; and
casting the crank case so as to include the hole.

19. An engine including an engine crank case comprising:
a crank region;
a gear region; and
at least two chamfered surfaces for receiving a reed valve assembly, the reed valve assembly controlling gas/fluid communication between the crank region and the gear region,
wherein the reed valve assembly includes at least one flexible stop adapted and configured to apply a force between the reed valve assembly and a gear cover.

20. A reed valve assembly, comprising:
an elongated body including
a first end including an opening for receiving a spring;
a second end opposite the first end;
an internal cavity extending from the second end toward the first end; and
at least one opening between the first end and the second end, the at least one opening extending from an outer surface of the body to the internal cavity; and
at least one flexible member having a periphery so as to substantially cover the at least one opening when positioned adjacent to the body, the at least one flexible member being pressure wave actuated from a closed position to an open position.

21. An engine including the reed valve assembly of claim 20.

22. A reed valve assembly, comprising:
an elongated body including
a first end;
a second end opposite the first end;
an internal cavity extending from the second end toward the first end; and
at least one opening between the first end and the second end, the at least one opening extending from an outer surface of the body to the internal cavity,
wherein an outer surface of the body includes at least one groove formed proximate to the first end of the body; and
at least one flexible member having a periphery so as to substantially cover the at least one opening when positioned adjacent to the body, the at least one flexible member being pressure wave actuated from a closed position to an open position.

23. An engine including the reed valve assembly of claim 22.

24. A reed valve assembly, comprising:
an elongated body including
a first end;
a second end opposite the first end;
an internal cavity extending from the second end toward the first end; and
at least one opening between the first end and the second end, the at least one opening extending from an outer surface of the body to the internal cavity,
wherein an outer periphery of the first end of the body is beveled; and
at least one flexible member having a periphery so as to substantially cover the at least one opening when positioned adjacent to the body, the at least one flexible member being pressure wave actuated from a closed position to an open position.

25. An engine including the reed valve assembly of claim 24.

* * * * *